_(12)_ United States Patent
Durfee

(10) Patent No.: US 11,291,166 B2
(45) Date of Patent: Apr. 5, 2022

(54) SYSTEMS FOR CULTIVATING PLANTS

(71) Applicant: Spacesaver Corporation, Fort Atkinson, WI (US)

(72) Inventor: Kenneth Durfee, Janesville, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 0 days.

(21) Appl. No.: 16/913,700

(22) Filed: Jun. 26, 2020

(65) Prior Publication Data

US 2021/0400883 A1    Dec. 30, 2021

(51) Int. Cl.
*A01G 9/02* (2018.01)

(52) U.S. Cl.
CPC .................... *A01G 9/022* (2013.01)

(58) Field of Classification Search
CPC .......... A01G 9/02; A01G 9/022; A01G 9/023; A01G 31/06; A01G 18/62; A47B 47/021; A47B 47/028; A47B 47/02; A47B 47/0058; A47B 47/0083; A47B 57/16; A47B 57/40; A47B 57/04; A47G 7/04; A47G 7/041
USPC ........................................................ 108/107
See application file for complete search history.

(56) References Cited

U.S. PATENT DOCUMENTS

| | | | | |
|---|---|---|---|---|
| 1,711,329 A | * | 4/1929 | Short ..................... | A47B 57/04 211/135 |
| 3,314,192 A | | 4/1967 | Park | |
| 4,359,947 A | * | 11/1982 | Marschak .............. | A47B 57/04 108/1 |
| 4,982,527 A | | 1/1991 | Sprung | |
| 5,181,623 A | * | 1/1993 | Linden ................... | A47B 57/04 211/183 |
| 5,632,389 A | * | 5/1997 | Rosenband ............ | A47B 57/40 108/109 |
| 6,253,687 B1 | * | 7/2001 | McAllister ............. | A47B 57/04 108/107 |
| 7,278,237 B2 | | 10/2007 | Okabe et al. | |
| 2006/0162246 A1 | | 7/2006 | Okabe et al. | |
| 2006/0266726 A1 | * | 11/2006 | Swanson .............. | A47B 47/021 211/186 |

(Continued)

FOREIGN PATENT DOCUMENTS

| | | | | |
|---|---|---|---|---|
| CA | 3041762 A1 | * | 6/2018 | ........... A47B 57/482 |
| CN | 107087947 A | * | 8/2017 | |

(Continued)

*Primary Examiner* — Magdalena Topolski
*Assistant Examiner* — Katherine Anne Kloecker
(74) *Attorney, Agent, or Firm* — Andrus Intellectual Property Law, LLP

(57) ABSTRACT

A system for cultivating a plurality of plants includes a tray configured to receive and support the plurality of plants, a rack that supports the tray, and a removable drainage directing insert. The rack includes a first side, an opposite second side, and first beam and a second beam that each extend between the first side and the second side to thereby define a front and a rear of the rack. The first beam and the second beam are vertically offset from each other such that the tray slopes towards the front of the rack. The removable insert is positioned between a front edge of the tray and the rack and extends along the first beam. The insert tapers in a first direction from the second side of the rack to the first side of the rack such that the tray slopes toward the first side of the rack.

20 Claims, 10 Drawing Sheets

(56) References Cited

U.S. PATENT DOCUMENTS

| | | | | |
|---|---|---|---|---|
| 2012/0000872 A1* | 1/2012 | Troyner | ............... | A47B 57/00 |
| | | | | 211/150 |
| 2012/0067838 A1* | 3/2012 | Lawson | ............... | A47B 47/028 |
| | | | | 211/134 |
| 2012/0223041 A1* | 9/2012 | Lee | ............... | A47B 57/04 |
| | | | | 211/150 |
| 2014/0110364 A1* | 4/2014 | Vogel | ............... | A47F 7/28 |
| | | | | 211/74 |
| 2015/0090683 A1* | 4/2015 | Sabounjian | ............... | A47B 47/028 |
| | | | | 211/186 |
| 2015/0359330 A1* | 12/2015 | Offerman | ............... | A47B 47/03 |
| | | | | 211/186 |
| 2016/0345518 A1* | 12/2016 | Collier | ............... | A01G 31/06 |
| 2019/0150615 A1* | 5/2019 | Albarran | ............... | A47F 5/0068 |
| 2019/0230878 A1* | 8/2019 | Albert | ............... | A01G 31/06 |
| 2019/0239641 A1* | 8/2019 | Miller, Jr | ............... | A47B 96/021 |
| 2020/0268152 A1* | 8/2020 | Siples | ............... | A47B 57/406 |
| 2020/0375120 A1* | 12/2020 | Kaneko | ............... | B62B 3/002 |

FOREIGN PATENT DOCUMENTS

| | | | | |
|---|---|---|---|---|
| DE | 202012009433 U1 * | 11/2012 | ......... | A47B 47/0083 |
| GB | 1123761 A * | 8/1968 | ............. | A47B 57/40 |
| WO | WO-2012136560 A2 * | 10/2012 | ............. | A47B 73/00 |
| WO | 2016014843 A1 | 1/2016 | | |
| WO | 2019003201 A2 | 1/2019 | | |
| WO | 2019003201 A3 | 1/2019 | | |

* cited by examiner

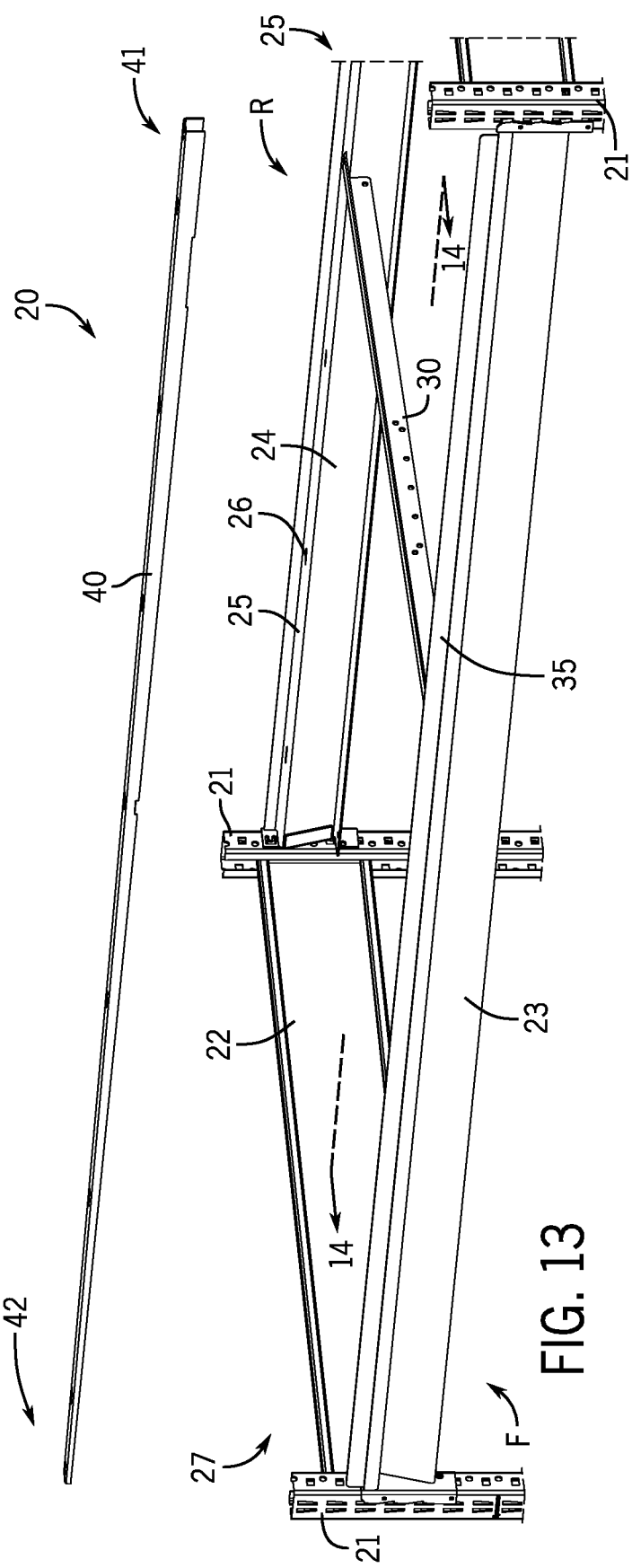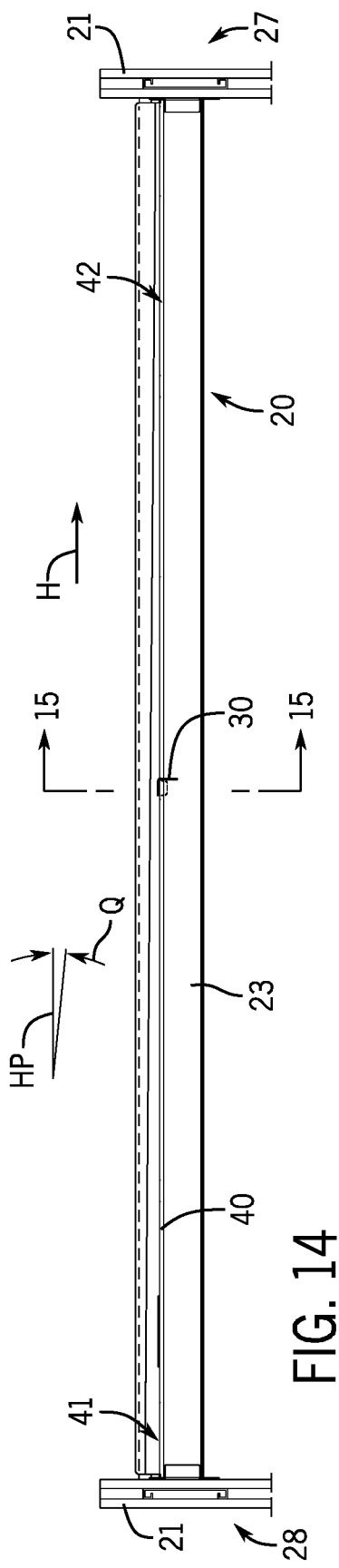

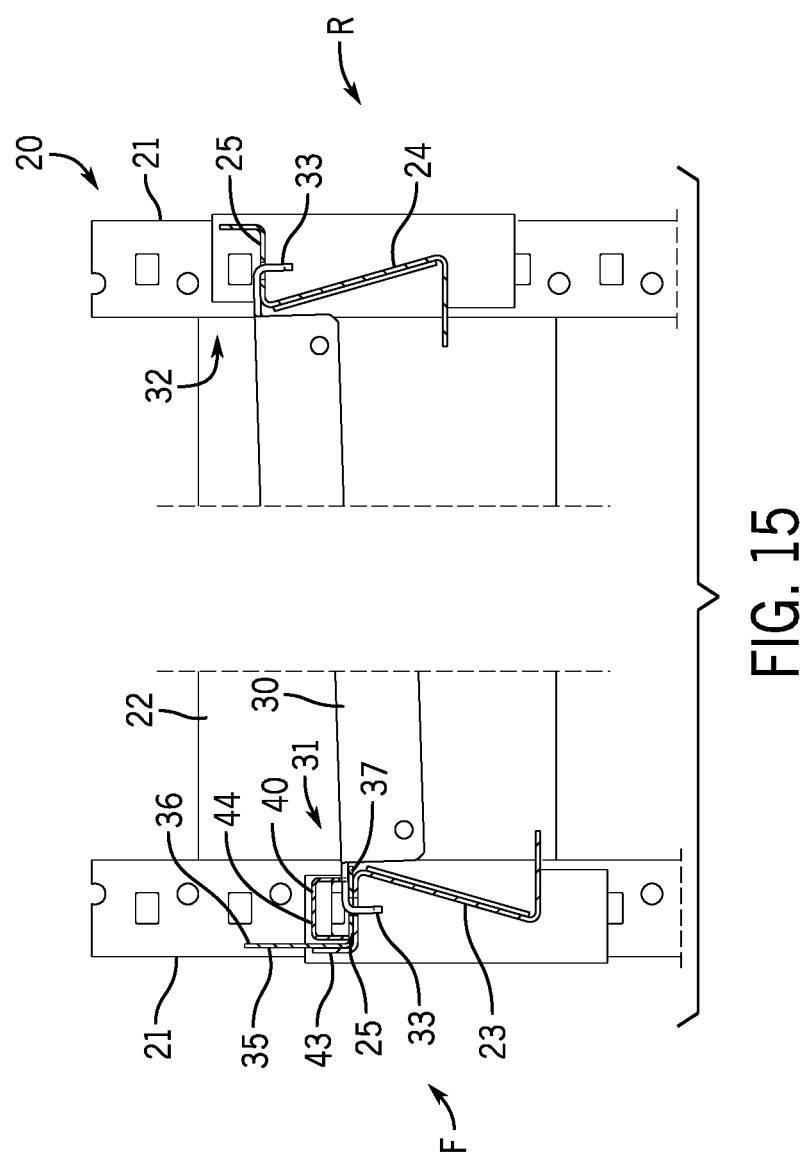

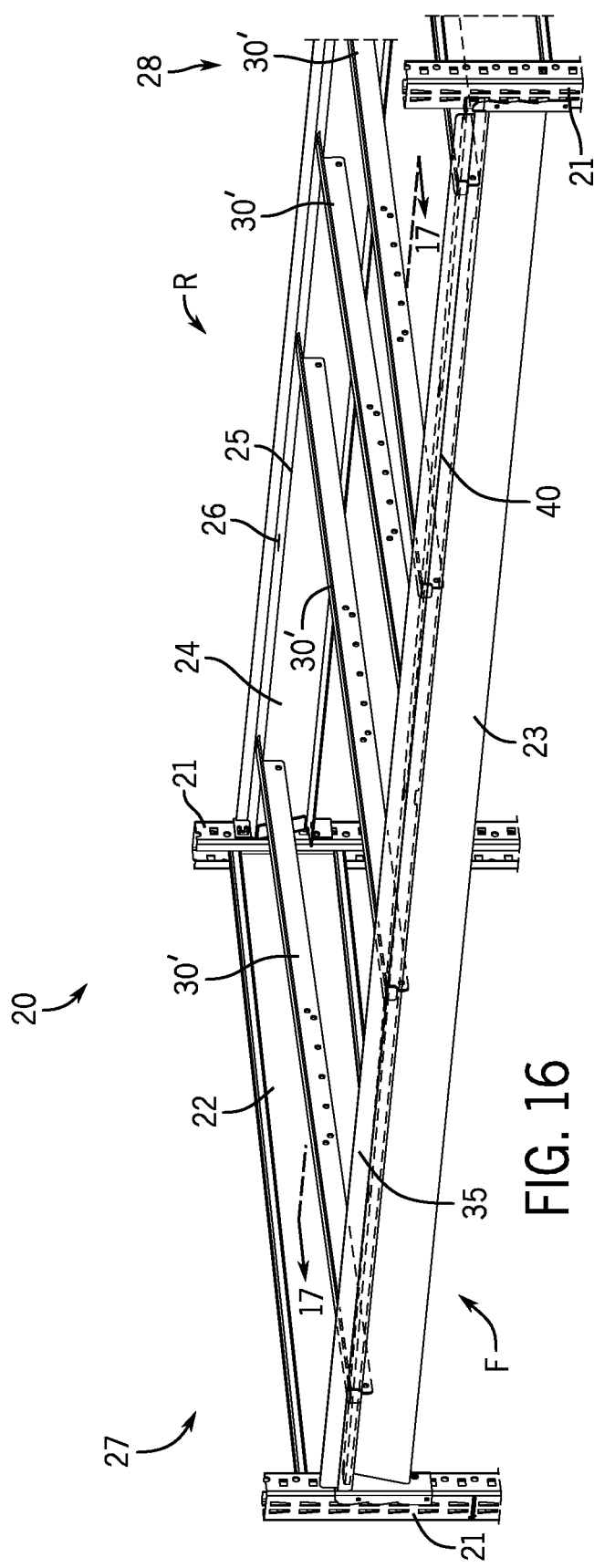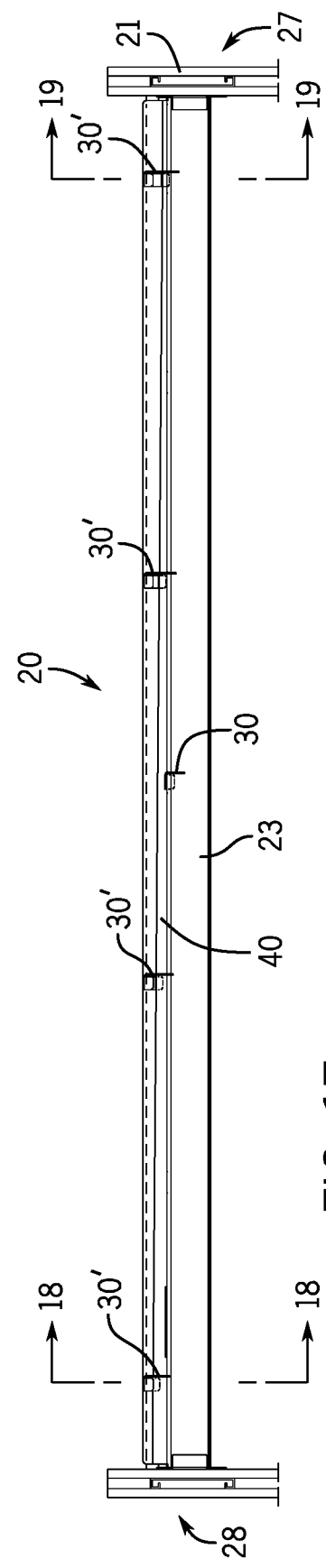
FIG. 16
FIG. 17

SYSTEMS FOR CULTIVATING PLANTS

FIELD

The present disclosure generally relates to systems for cultivating plants, and specifically to systems with removable trays that support a plurality of plants and direct water in a desired direction.

BACKGROUND

Conventional indoor plant cultivation systems are known to use irrigation systems to provide water to plants. In particular, the irrigation systems receives water from a water source and provides the water to one or more racks that support a plurality of trays in which soil and the plants are positioned. The water is distributed to the plants, and excess water drains from the trays.

Currently available trays used in conventional cultivation systems are often permanently sloped or angled. For example, the trays are formed to drain water toward a specific side of the rack. Thus, it can be difficult to reconfigure trays within the rack, and it may be necessary to have a reserve quantity of each type of tray. Furthermore, the time necessary to reconfigure the trays in the conventional systems can be extensive and require that the plants be removed before reconfiguring the trays in the rack. Therefore, a need exists for a system that permits trays to be efficiently reoriented such that water properly drains from the trays.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a system for cultivating a plurality of plants includes a tray configured to receive and support the plurality of plants, a rack that supports the tray, and a removable drainage directing insert. The rack includes a first side, an opposite second end, and a first beam and a second beam that each extend between the first side and the second side to thereby define a front and a rear of the rack. The first beam and the second beam are vertically offset from each other such that when the tray is installed, the tray slopes towards the front of the rack. The removable drainage directing insert is positioned between the tray and the rack and extends along the length of the first beam. When installed, the insert tapers in a first direction from the second side of the rack to the first side of the rack such that when the front edge of the tray is supported on the insert, the tray slopes toward the first side of the rack.

In certain exemplary embodiments of the disclosure, a system for supporting a tray in which a plurality of plants are received includes a rack configured to support the tray and a removable drainage directing insert. The rack has a first side, an opposite second side, and a first beam and a second beam that each extend between the first side and the second side to thereby define a front and a rear of the rack. The first beam and the second beam are vertically offset from each other such that when the tray is supported on the rack, the tray slopes towards the front of the rack. The removable insert is received on the front beam and tapers in a first direction from the second side of the rack to the first side of the rack. When the front edge of the tray is received on the removable insert, the tray slopes toward the first side of the rack.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 13 is a partial perspective view of the system of FIG. 1.

FIG. 14 is a front view of the system along 14-14 in FIG. 13.

FIG. 15 are enlarged views of system along line 15-15 in FIG. 14.

FIG. 16 is a partial perspective view of the system of FIG. 1.

FIG. 17 a front view of the system along 17-17 in FIG. 16.

DETAILED DESCRIPTION

Figure 1:
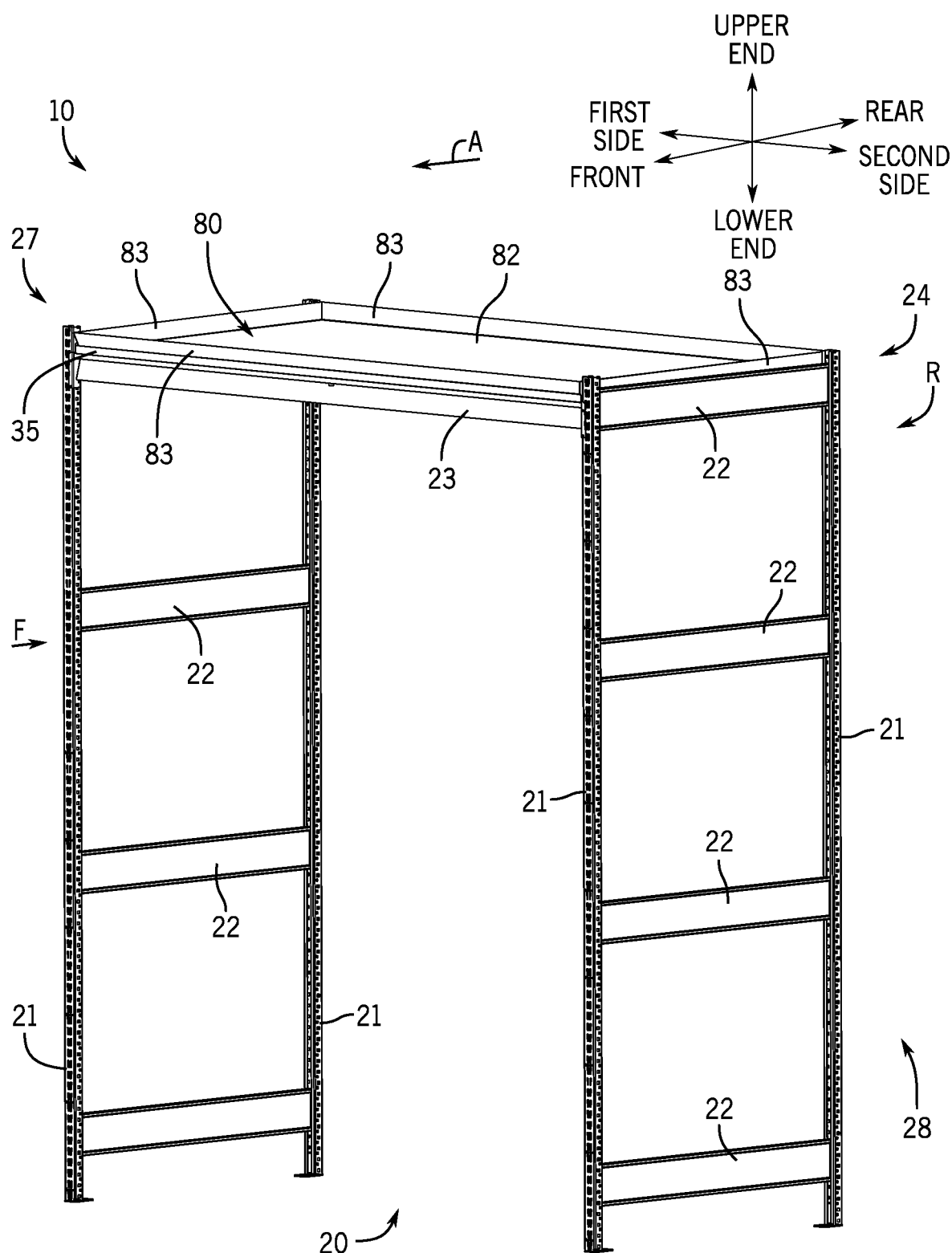
FIG. 1 is a perspective view of a system for cultivating plants including a rack and a tray supported on the rack.
Figure 2:
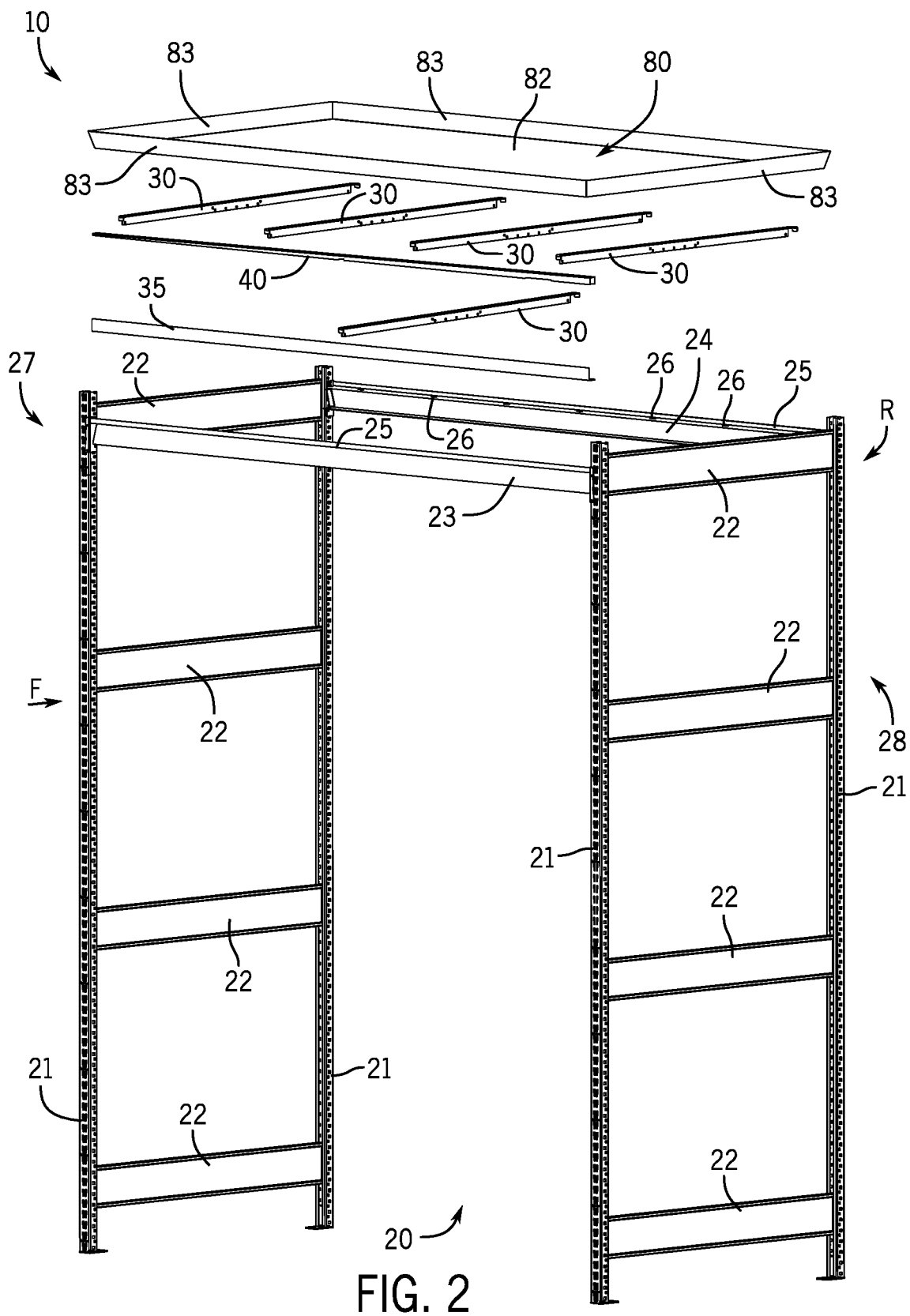
FIG. 2 is an exploded view of the system of FIG. 1.

FIGS. 1 and 2 illustrate a system 10 for cultivating plants in accordance with the present disclosure. The system 10 includes a one or more racks 20 that support planting structures in which a plurality plants are received. In the embodiment illustrated, the rack 20 is supported on a floor. However, it is contemplated that the rack 20 can be hung from a ceiling and/or be part of a mobile racking storage system.

The rack 20 includes an outer frame formed in part by a series of vertical uprights 21 and a plurality of crossbars 22. The crossbars 22 extend between adjacent vertical uprights 21 to define opposing sides, namely a first side 27 and a second side 28, of the rack 20.

The rack 20 includes a set of beams, namely a front beam 23 and a rear beam 24 that join the two sides of the rack 20 and thereby define a front F and a rear R of the rack 20, respectively. Each beam 23, 24 has a top, generally planar support surface 25 for supporting a planting structure, such as a tray 80 (described further herein), and/or other components of the system 10 (described herein) thereon. The beams 23, 24 are vertically offset from each other such that water in the tray 80 drains (see arrow A) toward the front F of the rack 20 (further described herein below). Note that in other examples, the beams 23, 24 could be arranged such that water drains toward the rear R of the rack 20. The vertical position of the beams 23, 24 along the vertical uprights 21 can vary to control the direction of water travel. In the embodiment shown in FIG. 1, only the beams 23, 24 located near the upper end of the rack 20 are shown. Additional beams 23, 24 can extend between the sides of the rack 20 to support additional trays in a vertically spaced relationship. A person of ordinary skill in the art will also recognize that the rack 20 can include multiple sets of beams 23, 24 such that the rack 20 supports multiple planting structures (e.g., trays 80) in a vertically stacked configuration.

Figure 3:
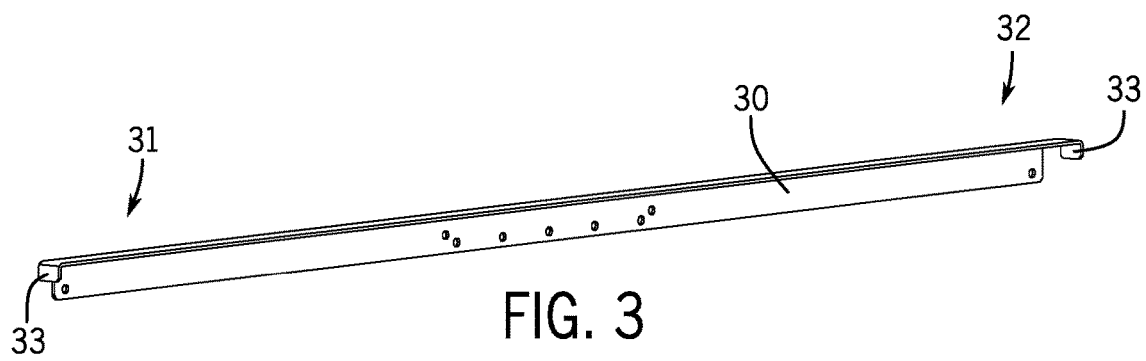
FIG. 3 is a perspective view of a brace.

Referring to FIGS. 2-3, a plurality braces 30 extend between the front and rear beams 23, 24 to support the center area of the tray 80 on the rack 20. Each brace 30 has a first brace end 31 and an opposite second brace end 32. Both brace ends 31, 32 have a hook 33 that is inserted into one or more holes defined in other components of the system 10 (described further herein). The size and shape of the brace 30 can vary, and the example brace 30 depicted in FIG. 3 has a generally L-shaped cross-section.

Figure 4:
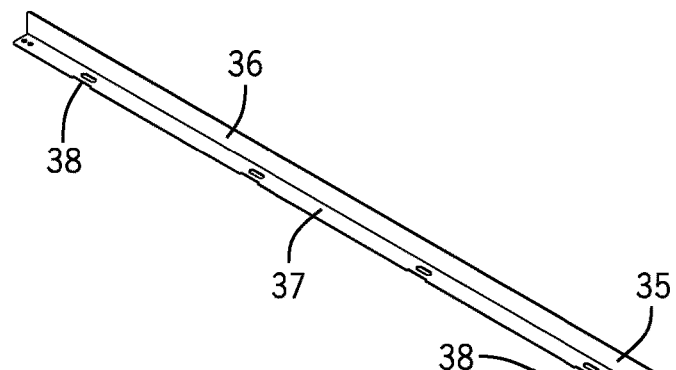
FIG. 4 is a perspective view of a trim member.

Referring to FIGS. 2 and 4, a trim member 35 extends along the front beam 23 and is configured to retain the tray 80 in the rack 20. The trim member 35 has a pair of legs, namely a first leg 36 and a second leg 37, and the first and second legs 36, 37 extend transverse to each other. The second leg 37 has a plurality of holes 38 that are spaced apart from each other. When the trim member 35 is placed onto the support surface 25 of the front beam 23, the holes 38 in the second leg 37 align with the holes 26 in the front beam 23 (see holes 26 in the support surface 25 of the rear beam 24 depicted best in FIG. 7). The size and shape of the trim member 35 can vary, and the example trim member 35 depicted in FIG. 4 has an L-shaped cross-section.

Figure 5:
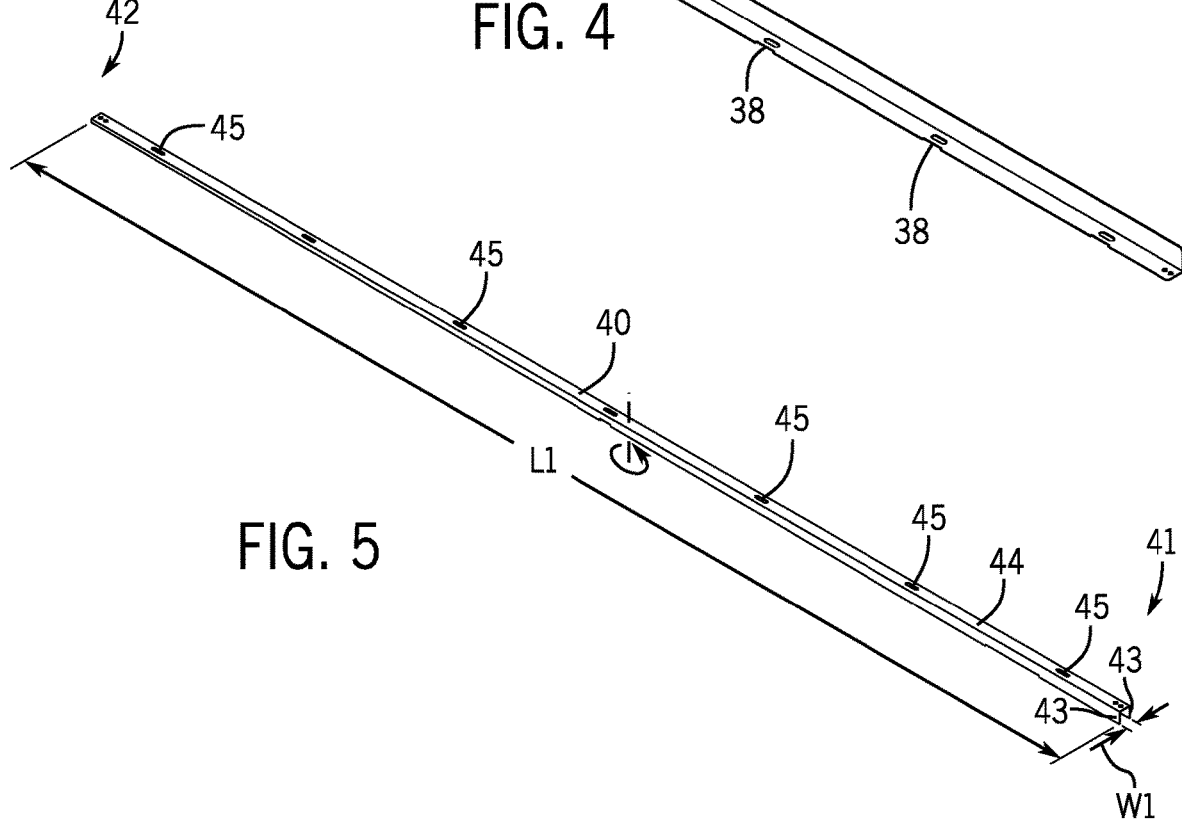
FIG. 5 is a perspective view of a drainage directing insert.
Figure 18:
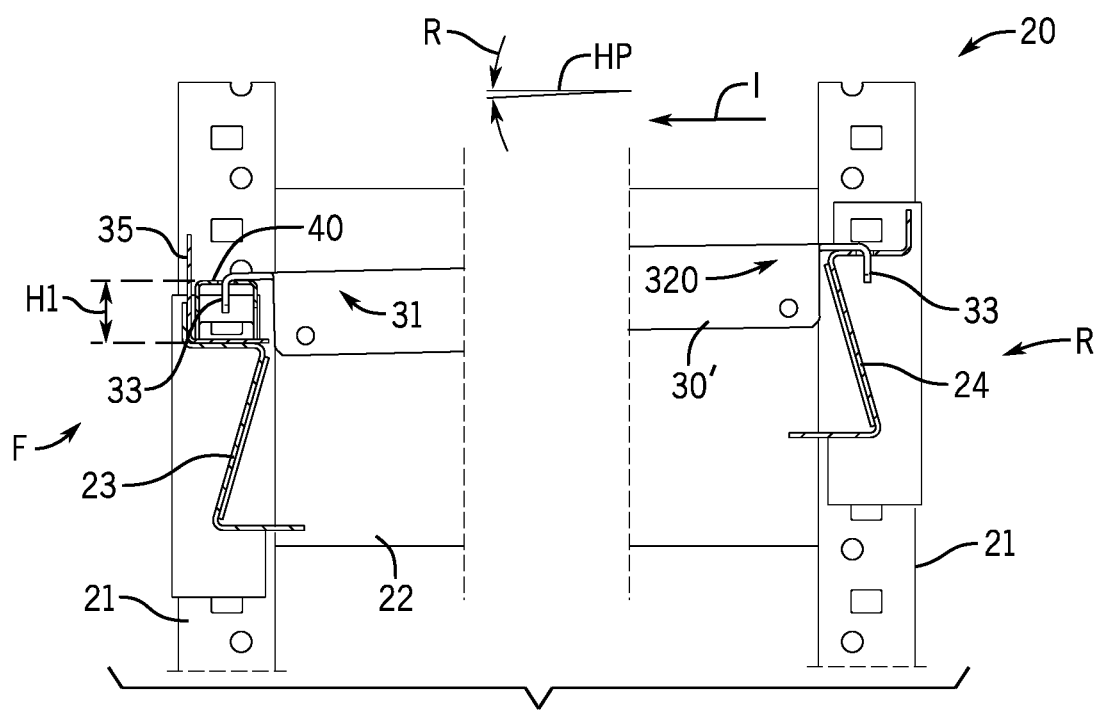
FIG. 18 are enlarged views of system along line 18-18 in FIG. 17.
Figure 19:
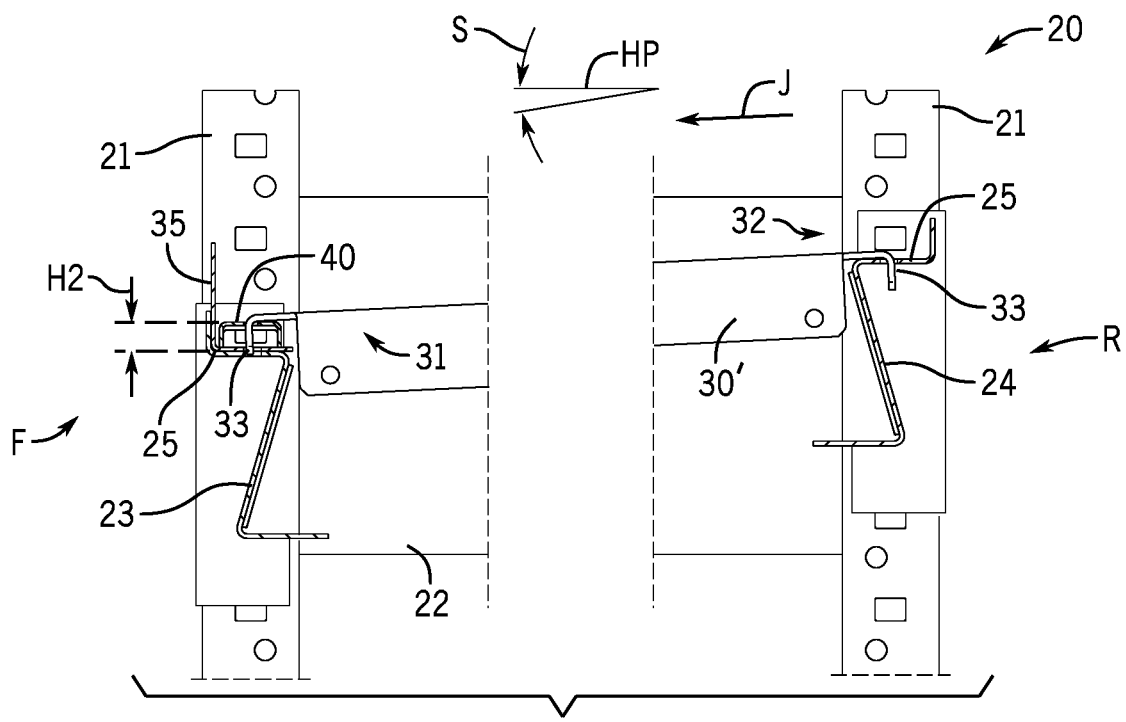
FIG. 19 are enlarged views of system along line 19-19 in FIG. 17.

Referring to FIGS. 2 and 5, a removable drainage directing insert 40 extends along the front beam 23 and is designed for sloping the tray 80 toward one side 27, 28 of the rack 20 (further described herein). The drainage directing insert 40 has a first insert end 41 and an opposite second insert end 42. The width W1 of the insert 40 is consistent along its length L1, however, the height of the insert 40 tapers from the first insert end 41 toward the second insert end 42. That is, the height of the insert 40 decreases from the first insert end 41 toward the second insert end 42. For example, the height H1 (see cross-section of the insert 40 depicted in FIG. 18) near the first insert end 41 is greater than the height H2 (see cross-section of the insert 40 depicted in FIG. 19) near the second insert end 42. The insert 40 has a body including a top wall 44 with a plurality of insert holes 45 and a pair of opposing sidewalls 43 extending from the top wall 44. Note that the top wall 44 and the sidewalls 43 extend between the insert ends 41, 42. The size and shape of the insert 40 can vary, and the example insert 40 depicted in FIG. 5 has a U-shaped cross-section.

Figure 6:
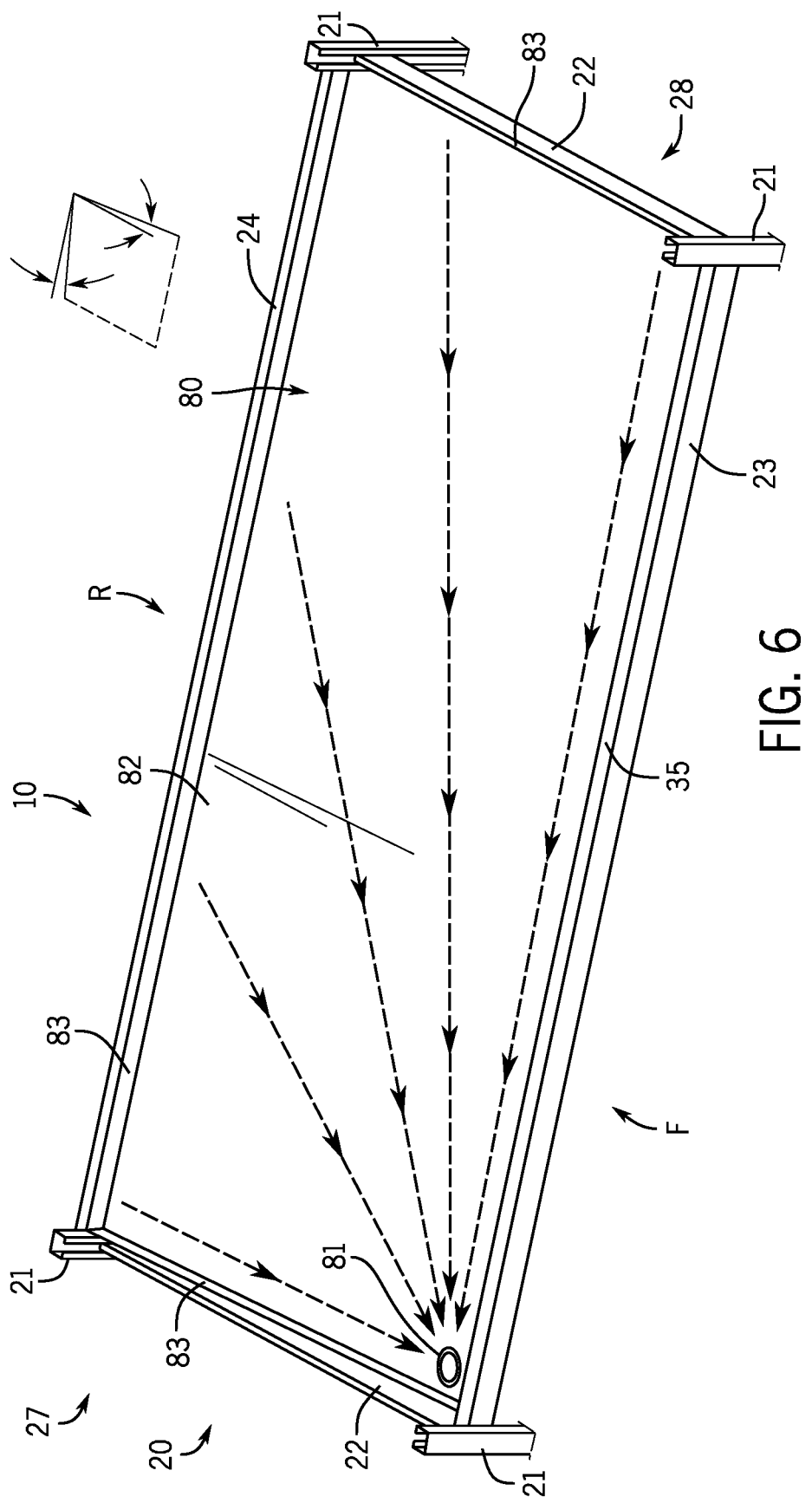
FIG. 6 is an enlarged view of the system in FIG. 1.

FIG. 6 depicts the tray 80 supported by the rack 20 such that water in the tray 80 (see arrows) drains toward one corner of the tray 80 (e.g., front-first side corner, front-second side corner, rear-first side corner, rear-second side corner). The corner of the tray 80 to which the water drains corresponds to the orientation and positioning of the underlying beams 23, 24, the braces 30, and insert 40.

The tray 80 has a bottom panel 82 and sidewalls 83 along the perimeter of the bottom panel 82. The sidewalls 83 have uniform heights (e.g., the heights of the sidewalls 83 are the same). The bottom panel 82 also has one or more drain holes 81 through which water drains.

The tray 80 is formed from any suitable material (e.g., plastic, metal alloy) such that when the tray is placed into the rack 20, the tray 80 deforms under its weight and/or the weight of the plants and the water in the tray 80 into a shape that corresponds to the underlying support structure(s). A person of ordinary skill in the art will appreciate that the system 10 of the present disclosure does not require different types of trays (e.g., trays specifically constructed to drain toward the first side of the rack, trays specifically constructed to drain toward the second side of the rack). Instead, the system 10 of the present disclosure utilizes reconfigurable support components (e.g., the beams 23, 24, the braces 30, and the drainage directing insert 40) to influence the manner in which the tray 80 deforms and thereby drain water in a desired direction or side of the rack 20. As such, the system 10 can utilize multiple trays 80 of the same style, shape, and/or size.

In one example, as depicted in FIG. 6, when the tray 80 is placed in the rack 20, the tray 80 deforms or flexes such that the bottom panel 82 contacts the beams 23, 24, the braces 30 (FIG. 2), and/or the insert 40. Thus, the tray 80 deforms and the bottom panel 82 slopes toward the front-first side corner of the rack 20. The tray 80, the beams 23, 24, the braces 30, and the insert 40 of this example are described further herein with respect to FIGS. 7-19.

Figure 7:
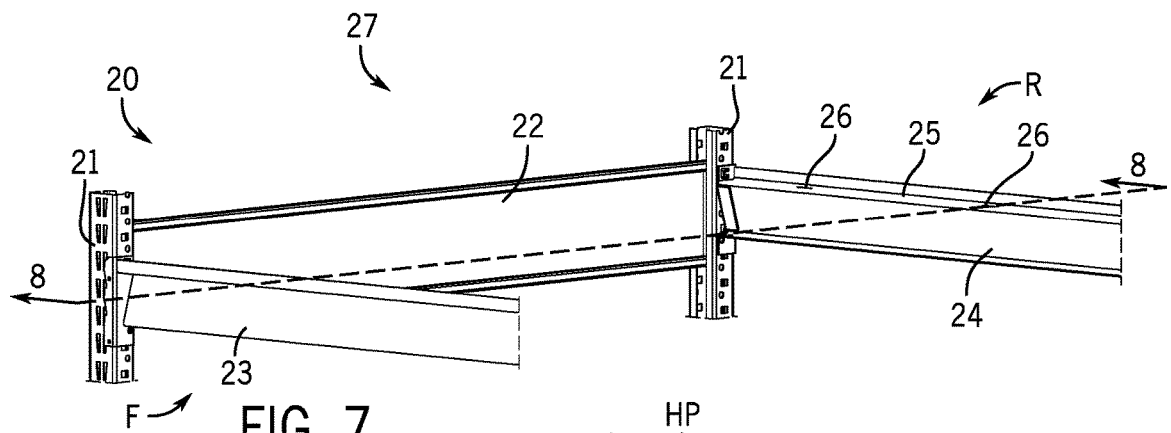
FIG. 7 is a partial perspective view of the system of FIG. 1.
Figure 8:
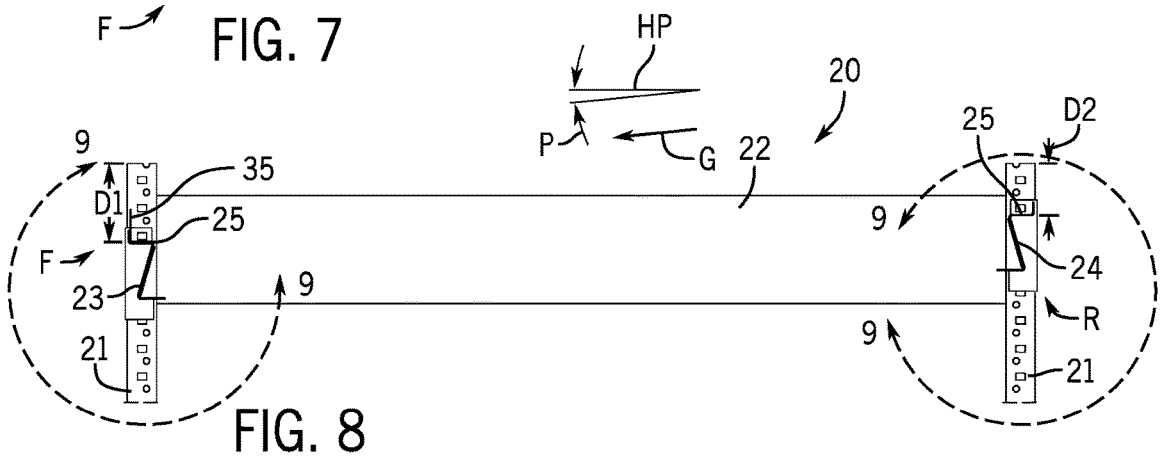
FIG. 8 is a side view of the system along line 8-8 in FIG. 7.
Figure 9:
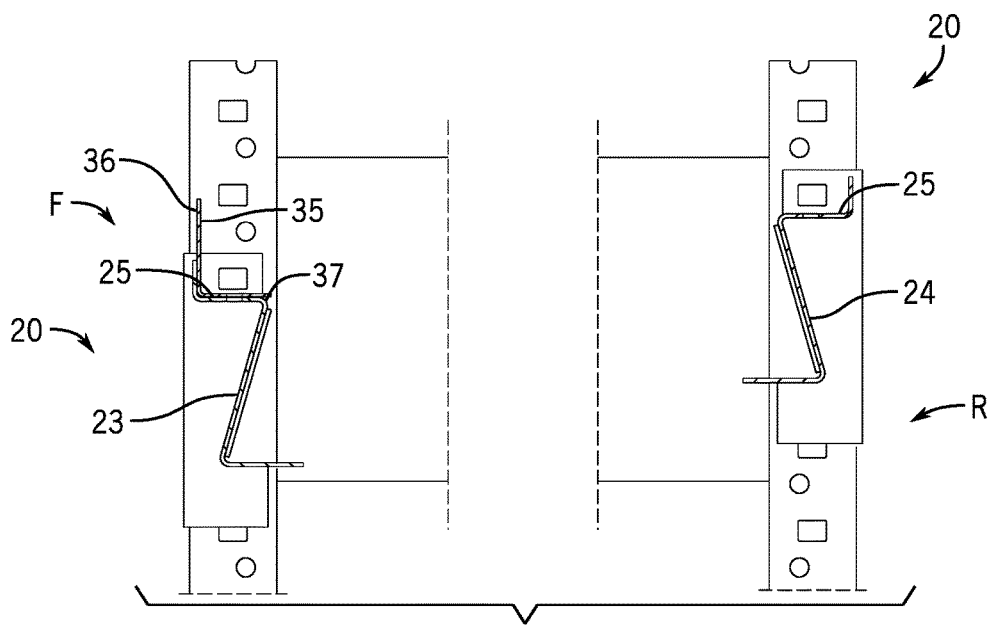
FIG. 9 are enlarged views of system within lines 9-9 in FIG. 8.

Referring specifically to FIGS. 7-9, the front and rear beams 23, 24 couple to the vertical uprights 21 such that the support surface 25 of the front and rear beams 23, 24 are vertically offset from each other. In this example, the support surface 25 of the rear beam 24 is vertically above the support surface 25 of the front beam 23. Thus, when the tray 80 (FIG. 6) is placed in the rack 20, the tray 80 slopes toward the front of the rack 20 (see arrow G in FIG. 8) at an angle P relative to a horizontal plane HP. In the illustrated example, the distance D1 (FIG. 8) between the support surface 25 of the front beam 23 and the top of the vertical upright 21 is greater than the distance D2 (FIG. 8) between the support surface 25 of the rear beam 24 and the top of the vertical upright 21. Note that while FIGS. 7-9 depict only the first side of the rack 20, the beams 23, 24 couple to the second side of the rack 20. In one example, protrusions (not shown) extending from the ends of the beams 23, 24 are inserted into the holes in the vertical uprights 21 to thereby couple the beams 23, 24 to the vertical uprights 21.

Figure 10:
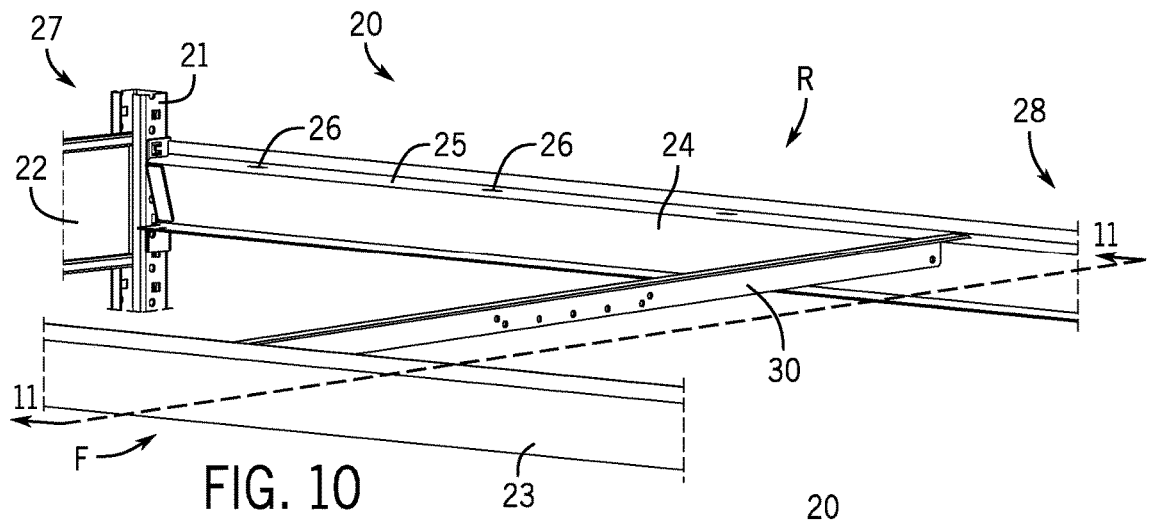
FIG. 10 is a partial perspective view of the system of FIG. 1.
Figure 11:
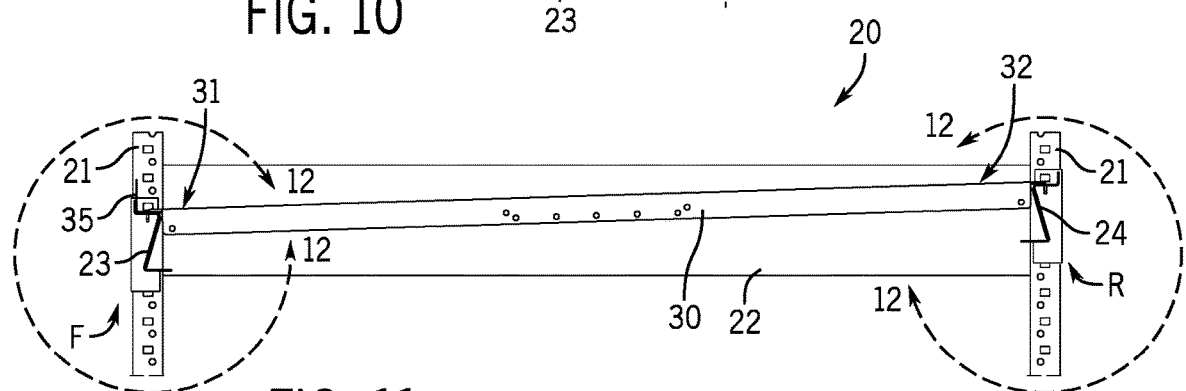
FIG. 11 is a side view of the system along 11-11 in FIG. 10.
Figure 12:
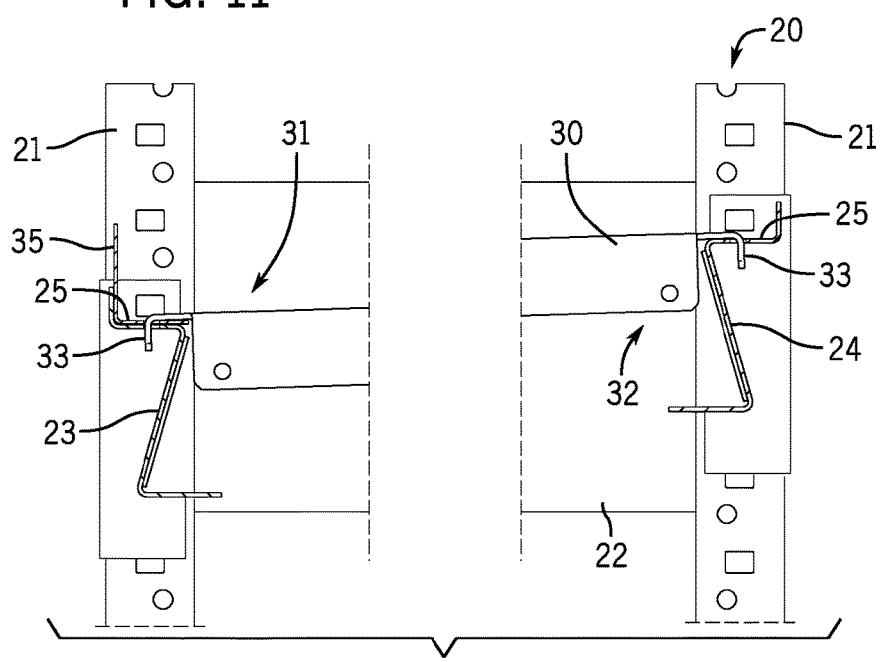
FIG. 12 are enlarged views of system within lines 12-12 in FIG. 11.

FIGS. 10-12 depict one brace 30 extending the front beam 23 and the rear beam 24. The brace 30 is coupled to the beams 23, 24 by inserting the hook 33 at the first brace end 31 into one of the holes 38 of the trim member 35 and the corresponding/aligned hole 26 in the support surface 25 of the front beam 23. Thus, the brace 30 secures the trim member 35 on the front beam 23. Similarly, the hook 33 at the second brace end 32 of the brace 30 is inserted into one hole 26 in the support surface 25 of the rear beam 24. Note that while FIGS. 10-12 depict only one brace 30, the rack 20 can include any number of braces 30 that couple to and extend between the beams 23, 24. In certain examples, the illustrated brace 30 supports the bottom panel 82 of the tray 80. In other examples, the illustrated brace 30 is vertically below the bottom panel 82 of the tray 80.

FIGS. 13-15 depict the drainage directing insert 40 positioned on the trim member 35 with the first insert end 41 near the second side of the rack 20 and the second insert end 42 near the first side of the rack 20. In this orientation, the drainage directing insert 40 tapers in a direction from the second side 28 of the rack 20 to the first side 27 of the rack 20. Thus, when a tray 80 is in the rack 20, the front edge of the tray 80 deforms and the bottom panel 82 (see FIG. 6) slopes toward the front-first side corner of the rack 20. Specifically, the bottom panel 82 (FIG. 6) slopes in a direction from the second side of the rack 20 to the first side of the rack 20 (see arrow H on FIG. 14) at an angle Q relative to a horizontal plane HP.

A person of ordinary skill in the art will recognize that the drainage directing insert 40 can be easily re-orientated on the front beam 23 to thereby change the direction the water drains. For example, the drainage directing insert 40 is rotatable one hundred and eighty degrees (see center axis on FIG. 5) from a first position depicted in FIG. 14 (e.g., in which the first insert end 41 is at the second side of the rack 20) to a second position (e.g., in which the first insert end 41 is at the first side of the rack 20) such that the tray 80 slopes toward the second side 28 of the rack 20 and the water drains toward the front-second side corner of the rack 20. In another example, the insert 40 can be "flipped" to re-orientate the insert 40. Note that FIG. 15 depicts the drainage directing insert 40 resting on top on the brace 30 depicted in FIG. 10

FIGS. 16-19 depict additional braces 30' extending between the rear beam 24 and the insert 40. The hook 33 at the second brace end 32 of each additional brace 30' is inserted into a hole 26 in the support surface 25 of the rear beam 24, and the hook 33 at the front brace end 31 of each additional brace 30' is inserted into one of the holes 45 in the body 44 of the insert 40 (see FIG. 5). The additional braces 30' support the tray 80 (FIG. 6) thereon, and the angle of each additional brace 30' relative to the horizontal plane HP varies. That is, the additional brace 30' near the first insert end 41 of the insert 40 (see FIG. 18) slopes in a direction from the rear of the rack 20 to the front of the rack 20 (see arrow I) at a first angle R relative to the horizontal plane HP. The additional brace 30' near the second end 42 of the insert 40 (see FIG. 19) slopes in the direction from the rear of the rack 20 to the front of the rack 20 (see arrow J) at a second angle S relative to the horizontal plane HP that is greater than the first angle R. Accordingly, when the tray 80 is placed onto the additional braces 30' the slope of the bottom panel (FIG. 6) varies.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for cultivating a plurality of plants, the system comprising:

a rack that includes a first side, an opposite second side, and first beam and a second beam that each extend between the first side and the second side to thereby define a front and a rear of the rack, wherein the first beam and the second beam are vertically offset from each other;

a tray configured to receive and support the plurality of plants, the tray being supported between the first beam and the second beam such that the tray slopes toward the front of the rack; and a drainage directing insert removably supported along the first beam, wherein the insert tapers in a first direction from the second side of the rack to the first side of the rack, wherein a front end of the tray is supported on the insert such that the tray slopes toward the first side of the rack.

2. The system according to claim 1, wherein the insert is moveable into and between a first position in which the insert tapers in the first direction such that the tray slopes toward the first side of the rack and a second position in which the insert tapers in a second direction opposite the first direction from the first side of the rack to the second side of the rack such that the tray slopes toward the second side of the rack.

3. The system according to claim 1, wherein the insert is rotatable one hundred and eighty degrees into a position in which the insert tapers in a second direction from the first side of the rack to the second side of the rack such that the tray slopes toward the second side of the rack.

4. The system according to claim 1, wherein the insert has a first insert end and an opposite second insert end, and wherein height of the insert decreases from the first insert end toward the second insert end.

5. The system according to claim 1, wherein the insert has a body including a top wall and a pair of opposing sidewalls extending from the top wall such that the insert has a U-shaped cross section.

6. The system according to claim 5, wherein the sidewalls extend toward the first beam.

7. The system according to claim 1, further comprising a trim member extending along the first beam to thereby retain the front end of the tray on the rack.

8. The system according to claim 7, wherein the trim member had a first leg extending transverse to the first beam to thereby retain the tray on the rack.

9. The system according to claim 8, wherein the trim member has a second leg extending transverse to the first leg, and wherein the second leg is between the first beam and the insert.

10. The system according to claim 1, further comprising a first brace extending between the first beam and the second beam to support the tray.

11. The system according to claim 10, wherein the first brace has a first brace end with a hook and an opposite second brace end with a hook;

wherein the hook at the first brace end is received into at least one of a hole in the first beam and a hole in the insert; and wherein the hook at the second brace end is received into a hole in the second beam.

12. The system according to claim 10, further comprising a second brace extending between the first beam and the second beam to thereby support the tray;

wherein the second brace is between the first side and the first brace;

wherein the first brace is sloped toward the front of the rack at a first angle relative to a horizontal plane and the second brace is sloped toward the front of the rack at a second angle relative to the horizontal plane; and wherein the first angle is less than the second angle.

13. The system according to claim 10, wherein the first brace secures the insert on the first beam.

14. The system according to claim 1, wherein the tray has a bottom panel and sidewalls extending along a perimeter of the bottom panel and transverse to the bottom panel.

15. The system according to claim 14, wherein the sidewalls have a uniform height relative to the bottom panel.

16. A system for supporting a tray in which a plurality of plants are received, the system comprising:
  a rack configured to support the tray and including a first side, an opposite second side, and first beam and a second beam that each extend between the first side and the second side to thereby define a front and a rear of the rack, wherein the first beam and the second beam are vertically offset from each other such that the tray slopes towards the front of the rack; and
  a removable drainage directing insert supported on the front beam, wherein the insert tapers in a first direction from the second side of the rack to the first side of the rack such that the tray slopes toward the first side of the rack.

17. The system according to claim 16, wherein the insert in moveable into and between a first position in which the insert tapers in the first direction from the second side of the rack to the first side of the rack such that the tray slopes toward the first side of the rack and a second position in which the insert tapers in a second direction opposite the first direction from the first side of the rack to the second side of the rack such that the tray slopes toward the second side of the rack.

18. The system according to claim 16, wherein the insert has a first insert end and an opposite second insert end, and wherein height of the insert decreases from the first insert end toward the second insert end.

19. The system according to claim 16, further comprising a trim member extending along the first beam to thereby retain the tray in the rack.

20. The system according to claim 16, further comprising a first brace and a second brace extending between the first beam and the second beam;
  wherein the first brace and the second brace are configured to support the tray;
  wherein the first brace is sloped toward the front of the rack at a first angle relative to a horizontal plane and the second brace is sloped toward the front of the rack at a second angle relative to the horizontal plane; and
  wherein the first angle is less than the second angle.

* * * * *